United States Patent
Tang et al.

(10) Patent No.: US 11,845,853 B2
(45) Date of Patent: Dec. 19, 2023

(54) PREPARATION METHOD OF COMPOSITE FILMS BASED ON CELLULOSE NANOCRYSTALS, CELLULOSE NANOFIBERS AND REDUCED GRAPHENE OXIDE

(71) Applicant: ZHEJIANG SCI-TECH UNIVERSITY, Zhejiang (CN)

(72) Inventors: Yanjun Tang, Hangzhou (CN); Zejun Ding, Hangzhou (CN); Tianying Chen, Hangzhou (CN)

(73) Assignee: ZHEJIANG SCI-TECH UNIVERSITY, Hangzhou (CN)

( * ) Notice: Subject to any disclaimer, the term of this patent is extended or adjusted under 35 U.S.C. 154(b) by 0 days.

(21) Appl. No.: 18/179,337

(22) Filed: Mar. 6, 2023

(65) Prior Publication Data

US 2023/0374275 A1 Nov. 23, 2023

Related U.S. Application Data

(63) Continuation of application No. PCT/CN2022/105806, filed on Jul. 14, 2022.

(30) Foreign Application Priority Data

May 19, 2022 (CN) .......................... 202210553168.X

(51) Int. Cl.
   *C08L 1/02* (2006.01)
   *C08K 3/04* (2006.01)
(52) U.S. Cl.
   CPC ............... *C08L 1/02* (2013.01); *C08K 3/042* (2017.05)
(58) Field of Classification Search
   None
   See application file for complete search history.

(56) References Cited

U.S. PATENT DOCUMENTS

| 2019/0206632 A1* | 7/2019 | Zhamu ................. H01G 11/86 |
| 2019/0247793 A1* | 8/2019 | Singamaneni ....... B01D 69/148 |

FOREIGN PATENT DOCUMENTS

| CN | 106146899 A | 11/2016 |
| CN | 109896522 A | 6/2019 |
| CN | 113718543 A | 11/2021 |

OTHER PUBLICATIONS

Pal et al, Combined effect of cellulose nanocrystal and reduced graphene oxide into poly-lactic acid matrix nanocomposite as a scaffold and its anti-bacterial activity, international journal of biological macromolecules, 95, pp. 94-105 (Year: 2017).*

(Continued)

*Primary Examiner* — Stefanie J Cohen
(74) *Attorney, Agent, or Firm* — METIS IP LLC

(57) ABSTRACT

The present disclosure discloses methods for preparing a composite film based on reduced graphene oxide, cellulose nanocrystals, and cellulose nanofibers. The method mainly includes: 1. preparing a suspension mixed with graphite oxide and cellulose; 2. centrifuging the suspension obtained in the step (1) and washing the sediment after centrifuging with deionized water to obtain a solution, homogenizing the solution in a high-pressure homogenizer to obtain a suspension mixed with graphene oxide, cellulose nanocrystals, and cellulose nanofibers; and 3. drying the suspension mixed with graphene oxide, cellulose nanocrystals, and cellulose nanofibers in a petri dish, and soaking a dried film in a hydroiodic acid solution; and washing the soaked film with deionized water to obtain the composite film of reduced graphene oxide, cellulose nanocrystals, and cellulose nanofibers. The composite film obtained has a higher specific capacitance and a better cycle stability than pure reduced graphene oxide obtained under a same preparation condition.

5 Claims, 6 Drawing Sheets

(56) References Cited

OTHER PUBLICATIONS

Yang et al, Ultrathin flexible reduced graphene oxide/cellulose nanofiber composite films with strongly anisotropic thermal conductivity and efficient electromagnetic interference shielding, jounnal of materials chemistry C, 5, pp. 3748-3756 (Year: 2017).*

Febriana et al, a simple approach of synthesis of graphene oxide from pure graphite: time stirring duration variation, AIP Conference Proceedings, 2382, Aug. 2021 (Year: 2021).*

First Office Action in Chinese Application No. 202210553168.X dated Sep. 27, 2022, 12 pages.

Decision to Grant a Patent in Chinese Application No. 202210553168.X dated Nov. 21, 2022, 3 pages.

Su, Zhanhua, Preparation of Graphene, Graphite Electrode Materials, 2020, 13 Pages.

* cited by examiner

PREPARATION METHOD OF COMPOSITE FILMS BASED ON CELLULOSE NANOCRYSTALS, CELLULOSE NANOFIBERS AND REDUCED GRAPHENE OXIDE

CROSS-REFERENCE TO RELATED APPLICATIONS

This application is a continuation of International Application No. PCT/CN2022/105806, filed on Jul. 14, 2022, which claims priority to Chinese Patent Application No. 202210553168.X, filed on May 19, 2022, the entire contents of each of which are hereby incorporated by reference.

TECHNICAL FIELD

The present disclosure relates to the field of thin film electrodes, and in particular, to methods for preparing a composite film based on reduced graphene oxide (RGO), cellulose nanocrystals (CNC), and cellulose nanofibers (CNF).

BACKGROUND

With the continuous consumption of fossil fuels and the deterioration of environmental problems, it is imminent to continuously search for clean and sustainable energy, and the corresponding high-efficiency energy storage and conversion technology has become a research hotspot. Supercapacitor is a new type of energy storage device between a battery and a conventional capacitor. The energy storage device realizes energy storage through the electric double layer effect, redox reaction, or intercalation between electrolyte ions and electrodes, which has the advantages of fast charge and discharge rate, high power density, and long cycle life.

Graphene is an emerging two-dimensional crystalline material. With the special structure, graphene has a high theoretical specific capacitance (~550 F/g), which has a wide range of applications in supercapacitors.

However, due to the strong π-π conjugation between graphene sheets, graphene sheets are easy to secondary stacking during a material forming process, which reduces the effective surface area of graphene and greatly affects the electrochemical performance of graphene. An effective manner may be to introduce a spacer layer between the graphene sheets, thereby alleviating the influence of the secondary stacking of graphene, and improving the electrochemical performance of graphene. The manner may be usually divided into three steps: (1) preparing a spacer layer material; (2) preparing graphene; and (3) mixing the spacer layer material with the graphene and making graphene with the spacer layer shaped. The manner is usually more complicated and consumes more resources, including raw materials, energy, time, etc. Therefore, it is of practical significance to find a more concise method for preparing a graphene composite with high electrochemical performance.

SUMMARY

The present disclosure provides methods for preparing a composite film based on reduced graphene oxide, cellulose nanocrystals, and cellulose nanofibers. The obtained composite film has a relatively high specific capacitance and a relatively good cycle stability, and presence of the cellulose nanocrystals and the cellulose nanofibers also improves a tensile strength of the composite film.

The present disclosure is implemented by the following technical schemes:

The Present Disclosure May Include:

in step (1), mixing graphite, potassium nitrate, potassium permanganate, and sulfuric acid in an ice water bath and stirring evenly, and transferring the reactants to a warm water bath for reaction;

subsequently, adding deionized water to a reaction system, increasing a temperature of the water bath, and stirring;

finally, lowering the temperature of the water bath, adding hardwood microcrystalline cellulose, and stirring; and adding hydrogen peroxide solution after stirring to terminate the reaction to obtain a suspension mixed with graphite oxide, cellulose nanocrystals and cellulose;

in step (2), centrifuging the suspension obtained in the step (1) and washing the sediment after centrifuging with deionized water to obtain a solution, homogenizing the solution in a high-pressure homogenizer to obtain a suspension mixed with graphene oxide, cellulose nanocrystals, and cellulose nanofibers;

in step (3), drying the suspension mixed with graphene oxide, cellulose nanocrystals, and cellulose nanofibers in a petri dish to obtain a dried film, and soaking the dried film in a hydroiodic acid solution, wherein the hydroiodic acid solution is used to reduce the graphene oxide, and reduced graphene oxide is obtained; and washing the soaked film with deionized water to obtain the composite film based on the reduced graphene oxide, cellulose nanocrystals, and cellulose nanofibers.

Furthermore, in the step (1), a temperature of the warm water bath may be 35° C. A reaction time in the warm water bath may be 0.5 h. The increased temperature of the water bath may be 80° C. The lowered temperature of the water bath may be 50° C.

Furthermore, in the step (2), a count of centrifugation and washing may be 2 times. A centrifugation rate may be 10,000 rpm. A time of a single centrifugation may be 10 min.

Furthermore, in the step (2), a pressure in the high-pressure homogenizer may be 60 MPa-80 MPa and a homogenization time may be 0.5 h.

Furthermore, in the step (3), a drying temperature may be 45° C. and a drying time may be 12 h. A mass fraction concentration of the hydriodic acid solution may be 47% and a soaking condition may be soaking for 10 min at 25° C.

Furthermore, in the composite film based on reduced graphene oxide, cellulose nanocrystals, and cellulose nanofibers in the step (3), a mass ratio of the reduced graphene oxide, the cellulose nanocrystals, and the cellulose nanofibers may be 1:0.1-1:0.1-2.

Beneficial Effects of the Present Disclosure:

(1) A ternary mixture of graphene oxide, the cellulose nanocrystals, and the cellulose nanofibers may be obtained through the present disclosure. The graphene oxide, the cellulose nanocrystals, and the cellulose nanofibers have a good compatibility and can exist stably in the form of a uniform dispersion. At the same time, the ternary mixture of graphene oxide, cellulose nanocrystals, and cellulose nanofibers may be prepared by a one-pot method, which can not only reduce use of hazardous chemicals, but also reduce energy consumption, and is in line with the concept of sustainable development.

(2) After simple drying and reduction, the composite film may be obtained based on the reduced graphene oxide, the cellulose nanocrystals, and the cellulose nanofibers. "Noodle"-like cellulose nanofibers may be interspersed between the reduced graphene oxide sheets. Since a surface of the cellulose nanofibers is rich in hydroxyl groups that can generate hydrogen bonds with the residual oxygen-containing functional groups on the surface of reduced graphene oxide, the cellulose nanofibers may be adsorbed on a surface of the reduced graphene oxide sheets, preventing the conjugation between the reduced graphene oxide sheets and stacking again. "Rice grain"-shaped cellulose nanocrystals may have a smaller size and be more likely to enter gaps formed between the reduced graphene oxide and the cellulose nanofibers, enhancing the bonding between the components. A unique size effect of "noodles" (cellulose nanofibers) and "rice grains" (cellulose nanocrystals) may synergistically promote building of the reduced graphene oxide and increase an effective specific surface area of the reduced graphene oxide, which can enhance mechanical performance and specific capacitance of the composite film.

DETAILED DESCRIPTION

Figure 1:
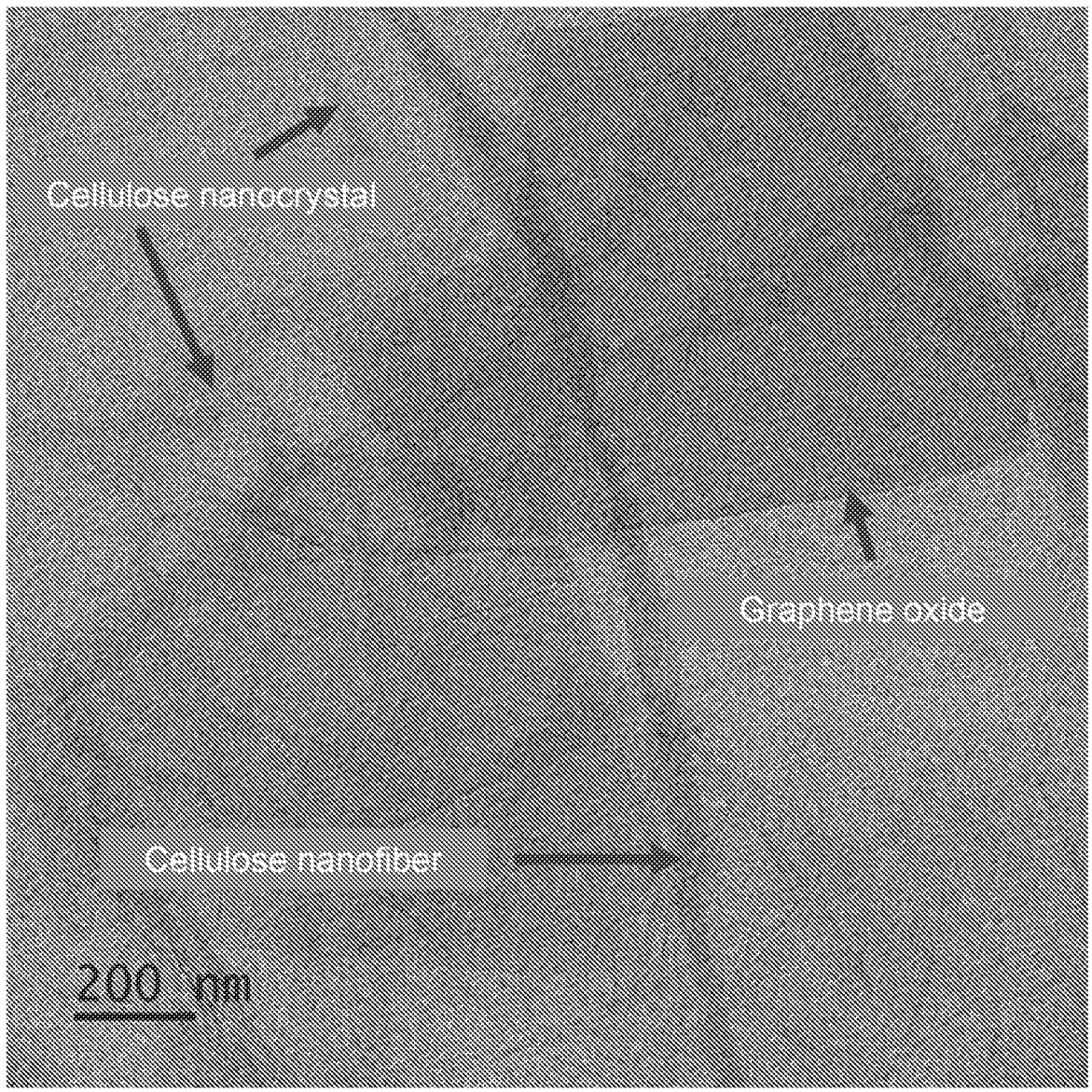
FIG. 1 is a transmission electron microscope image of a suspension including graphene oxide, cellulose nanocrystals, and cellulose nanofibers.

In order to further understand the present disclosure, the implementation schemes of the present disclosure are further described in detail in conjunction with the embodiments and comparative examples. However, the implementation schemes of the present disclosure are not limited thereto unless otherwise stated.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The present disclosure provides a one-pot method for preparing a composite film having reduced graphene oxide, cellulose nanocrystals, and cellulose nanofibers. The preparation method may mainly include two steps: chemical treatment and mechanical treatment. In a first step, through the chemical treatment, graphite may be oxidized to graphite oxide by strong oxidants (e.g., potassium nitrate, potassium permanganate), a distance between graphite sheets may increase, and acting force between the sheets may weaken. At the same time, under the action of sulfuric acid, part of cellulose in a suspension may be hydrolyzed to form the cellulose nanocrystals, and graphite oxide and a cellulose suspension containing the cellulose nanocrystals may be obtained. In a second step, the graphite oxide and the cellulose suspension containing the cellulose nanocrystals may be mechanically processed. Under homogenization of a high-pressure homogenizer, graphite oxide sheets may be opened to generate graphene oxide, and bonding between long chains of unhydrolyzed cellulose may be destroyed to generate the cellulose nanofibers. A method for preparing the composite film based on reduced graphene oxide, cellulose nanocrystals, and cellulose nanofibers is illustrated by the following embodiments.

Embodiment 1

In step (1), 1.0 g of graphite, 1.0 g of potassium nitrate, and 5.0 g of potassium permanganate may be weighed and added to 50 mL of 98% sulfuric acid, which may be stirred and mixed evenly in an ice water bath. Subsequently, the reactants may be transferred to a warm water bath at 35° C. for 0.5 h.

In step (2), 50 mL of deionized water may be added to the suspension in the step (1), which may be stirred for 0.5 h in a water bath at 80° C. to obtain a uniform suspension.

In step (3), 1.0 g of microcrystalline cellulose powder may be added to the uniform suspension obtained in the step (2), which may be stirred for 0.5 h in a water bath at 50° C.

In step (4), 20 mL of 30% hydrogen peroxide may be added to the product of the step (3) to terminate the reaction. The obtained suspension may be washed centrifugally twice under a condition that a centrifugation rate is 10000 rpm for 10 min.

In step (5), the centrifuged product obtained in the step (4) may be dispersed into deionized water and homogenized under high pressure for 0.5 h under a pressure of 60 MPa to obtain a uniform suspension mixed with graphene oxide, cellulose nanocrystals, and cellulose nanofibers. A transmission electron microscope image of the suspension is shown in FIG. 1.

In step (6), the suspension obtained in the step (5) may be dropped into a petri dish and dried in an oven at 45° C. for 12 h to obtain a composite film based on graphene oxide, cellulose nanocrystals, and cellulose nanofibers.

In step (7), the composite film in the step (6) may be soaked in a hydroiodic acid solution with a mass fraction concentration of 47% and reduced for 10 min. The film may be taken out and washed with deionized water to obtain a composite film based on reduced graphene oxide, cellulose nanocrystals, and cellulose nanofibers.

Figure 2:
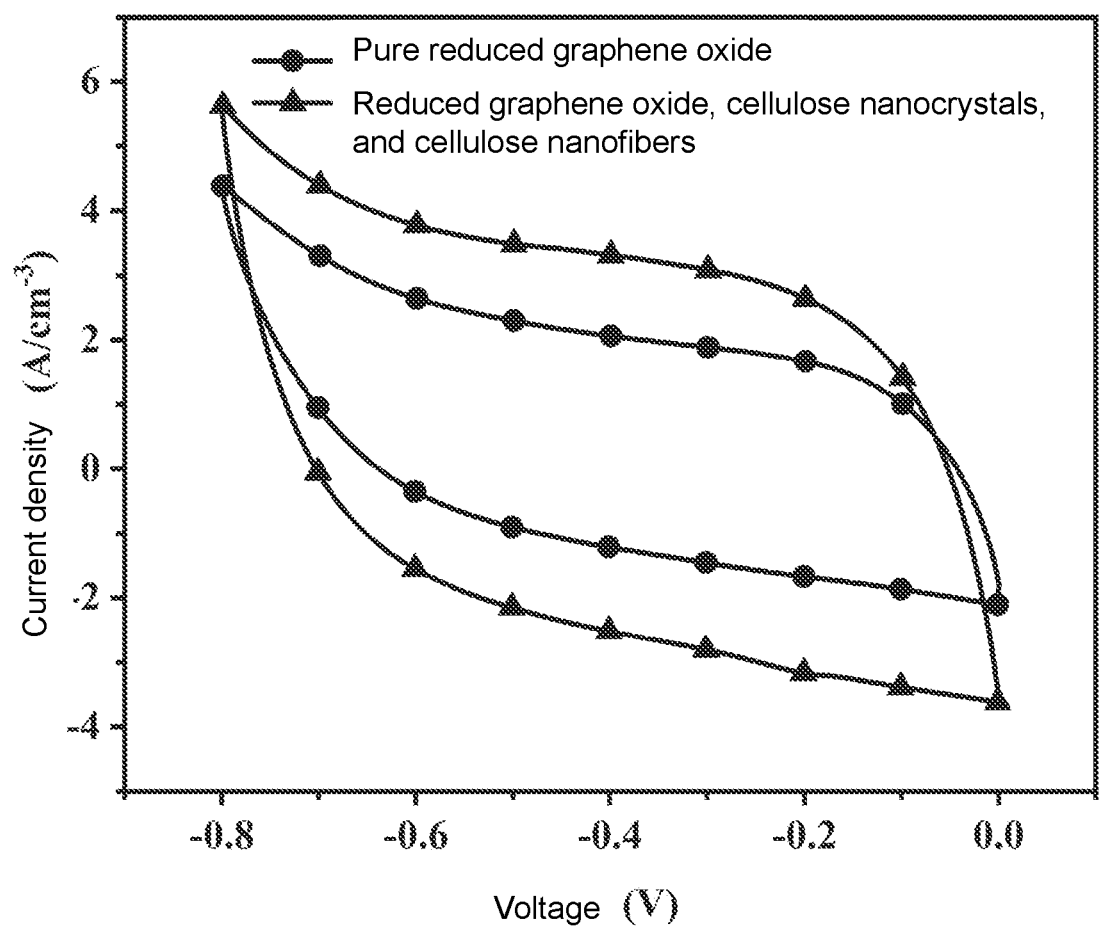
FIG. 2 is a diagram of current density-voltage (CV) curves of a composite film based on reduced graphene oxide, cellulose nanocrystals, and cellulose nanofibers prepared in Embodiment 1 and a film of pure reduced graphene oxide at a scan rate of 0.02 V/s.

FIG. 2 is a diagram of current density-voltage (CV) curves of a composite film based on reduced graphene oxide, cellulose nanocrystals, and cellulose nanofibers prepared in Embodiment 1 and a film of pure reduced graphene oxide at a scan rate of 0.02 V/s.

Figure 3:
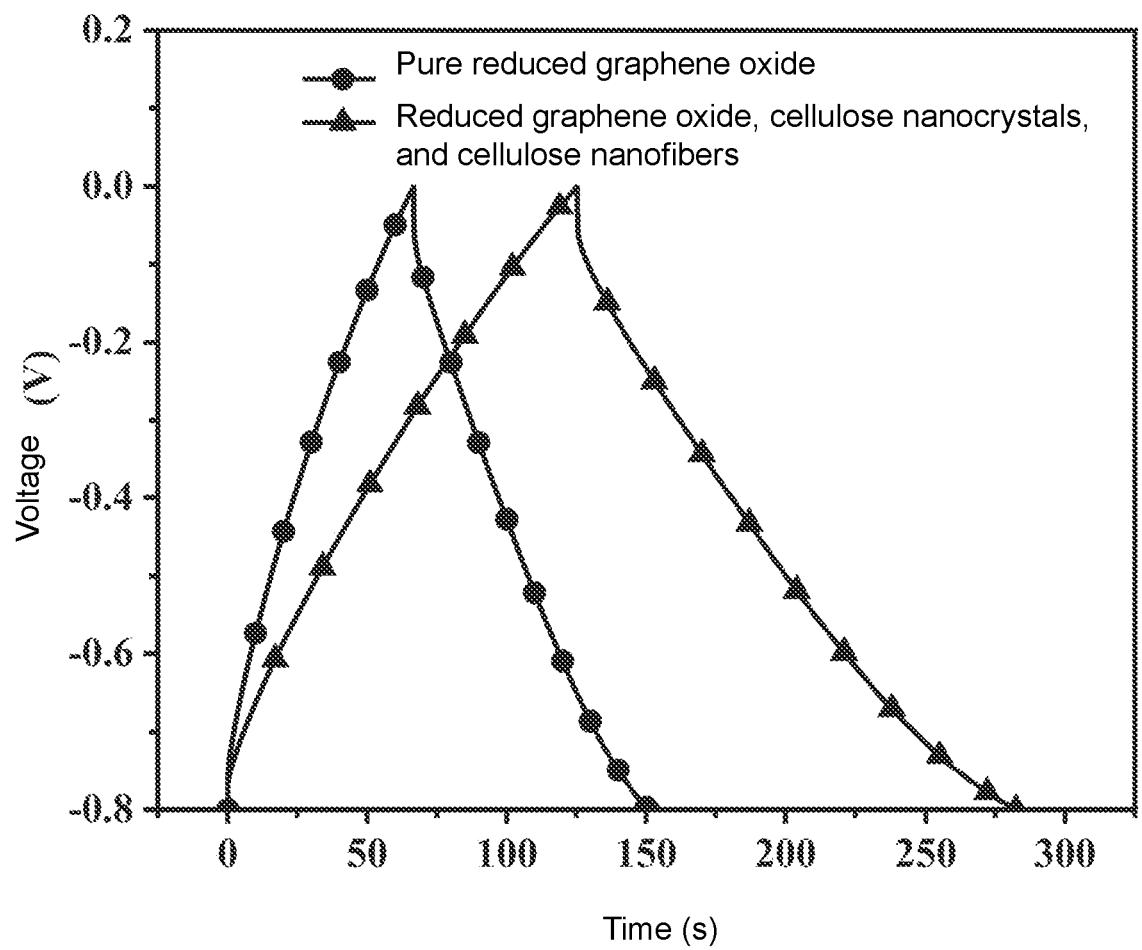
FIG. 3 is a diagram of galvanostatic charge/discharge (GCD) curves of a composite film based on reduced graphene oxide, cellulose nanocrystals, and cellulose nanofibers prepared in Embodiment 1 and a film of pure reduced graphene oxide at a current density of 1 A/cm$^3$.

It can be seen from FIG. 3 that a specific capacitance of the composite film based on reduced graphene oxide, cellulose nanocrystals, and cellulose nanofibers of the present embodiment is 171 F/cm$^3$, and a specific capacitance of the film of pure reduced graphene oxide is 105 F/cm$^3$.

Figure 4:
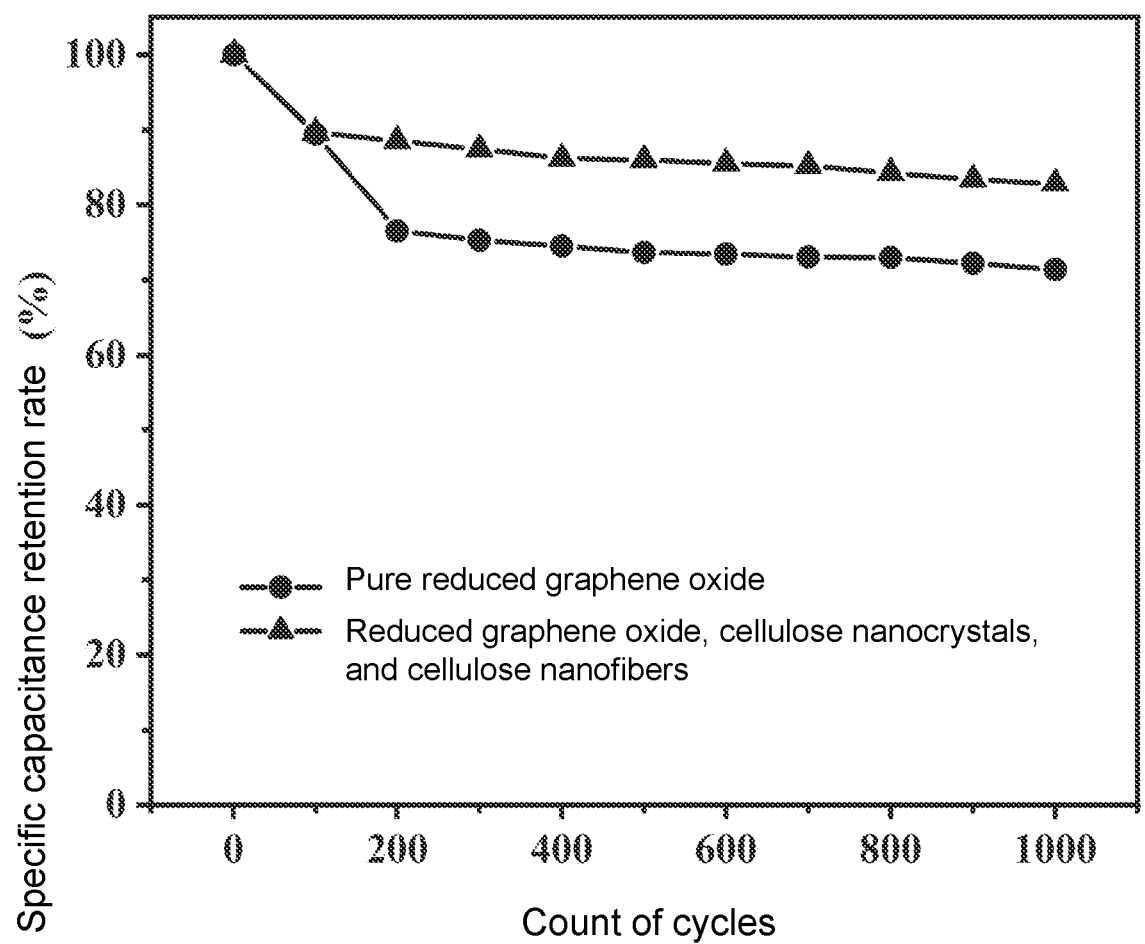
FIG. 4 is a diagram of a specific capacitance retention rate of a composite film based on reduced graphene oxide, cellulose nanocrystals, and cellulose nanofibers prepared in Embodiment 1 and a film of pure reduced graphene oxide after 1000 cycles.

It can be seen from FIG. 4 that after 1000 charge-discharge cycles, a capacitance retention rate of the composite film based on reduced graphene oxide, cellulose nanocrystals, and cellulose nanofibers is 82.83%, and a capacitance retention rate of the film of pure reduced graphene oxide is 71.35%.

Figure 5:
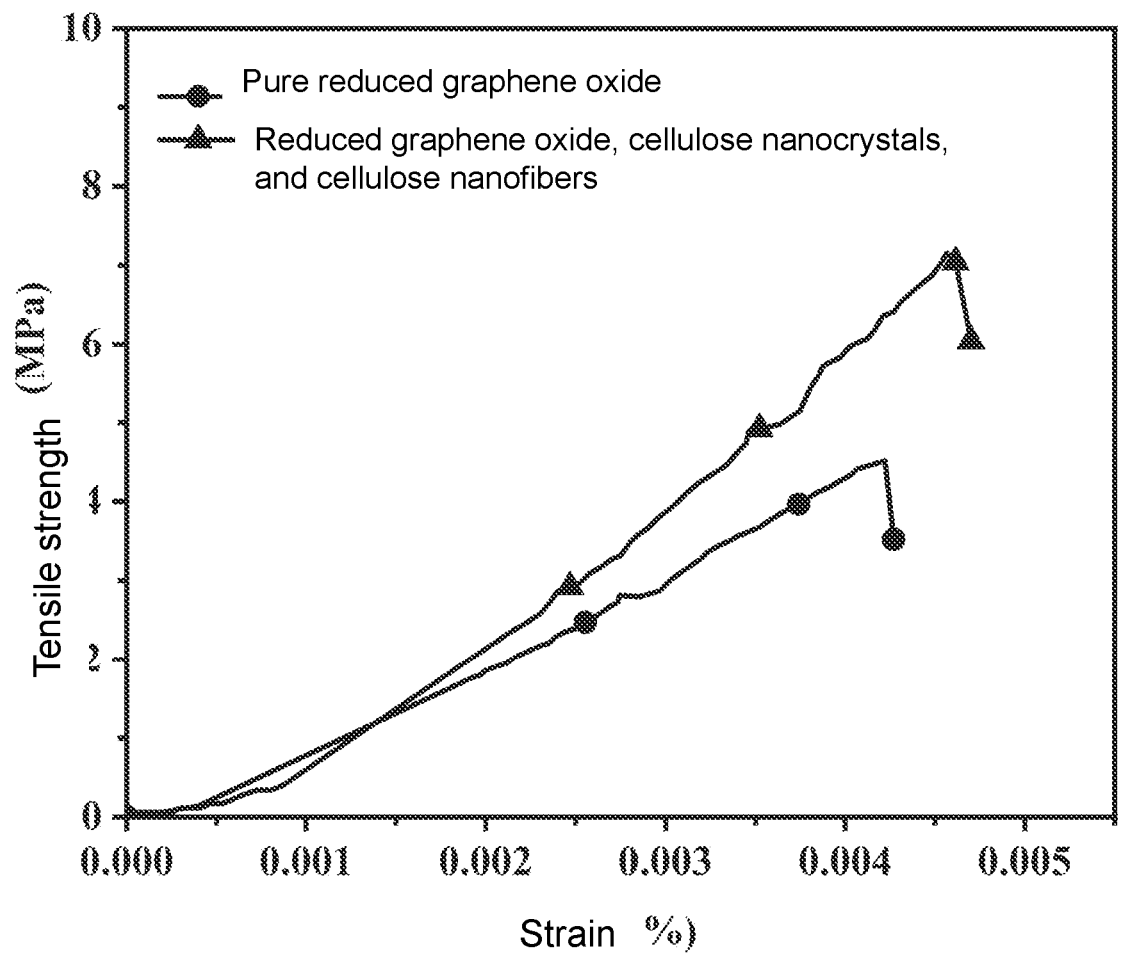
FIG. 5 is a diagram of tensile strength-strain curves of a composite film based on reduced graphene oxide, cellulose nanocrystals, and cellulose nanofibers prepared in Embodiment 1 and a film of pure reduced graphene oxide.

It can be seen from FIG. 5 that a tensile strength and an elongation at break of the composite film based on reduced graphene oxide, cellulose nanocrystals, and cellulose nanofibers are 7.03 MPa and 0.47%, respectively; and a tensile strength and an elongation at break of the film of pure reduced graphene oxide are 4.51 MPa and 0.43%, respectively.

Figure 6:
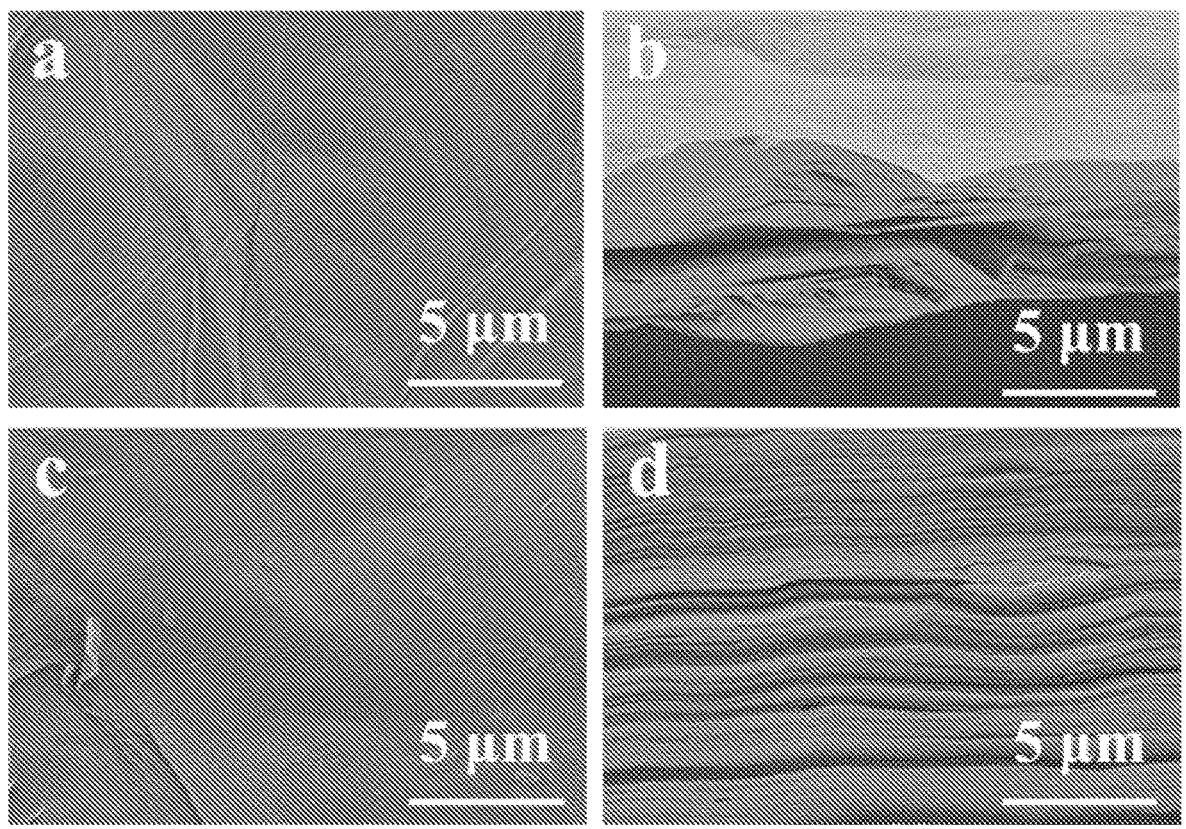
FIG. 6 is a diagram of a surface (a) and a cross-section (b) of a composite film based on reduced graphene oxide, cellulose nanocrystals, and cellulose nanofibers prepared in Embodiment 1 and a surface (c) and a cross-section (d) of a film of pure reduced graphene oxide.

It can be seen from FIG. 6 that the cellulose nanocrystals and the cellulose nanofibers are randomly distributed on a surface (a) of the composite film based on reduced graphene oxide, cellulose nanocrystals, and cellulose nanofibers, and gaps formed due to presence of nanocellulose can be observed from a section (b) of the composite film based on reduced graphene oxide, cellulose nanocrystals, and cellulose nanofibers; and a surface (c) of the film of reduced graphene oxide is relatively smooth, and reduced graphene oxide sheets closely stacked together can be observed from a cross-section (d) of the film of reduced graphene oxide.

Embodiment 2

In step (1), 1.0 g of graphite, 1.0 g of potassium nitrate, and 5.0 g of potassium permanganate may be weighed and added to 50 mL of 98% sulfuric acid, which may be stirred and mixed evenly in an ice water bath. Subsequently, the reactants may be transferred to a warm water bath at 35° C. for 0.5 h.

In step (2), 50 mL of deionized water may be added to the suspension in the step (1), which may be stirred for 0.5 h in a water bath at 80° C. to obtain a uniform suspension.

In step (3), 2.0 g of microcrystalline cellulose powder may be added to the uniform suspension obtained in the step (2), which may be stirred for 0.5 h in a water bath at 50° C.

In step (4), 10 mL of 30% hydrogen peroxide may be added to the product of the step (3) to terminate the reaction. The obtained suspension may be washed centrifugally twice under a condition that a centrifugation rate is 10000 rpm for 10 min.

In step (5), the centrifuged product obtained in the step (4) may be dispersed into deionized water, and homogenized under high pressure for 1.0 h under a pressure of 70 MPa to obtain a uniform suspension mixed with graphene oxide, cellulose nanocrystals, and cellulose nanofibers.

In step (6), the suspension obtained in the step (5) may be dropped into a petri dish and dried in an oven at 45° C. for 12 h to obtain a composite film based on graphene oxide, cellulose nanocrystals, and cellulose nanofibers.

In step (7), the composite film obtained in the step (6) may be soaked in a hydroiodic acid solution with a mass fraction concentration of 47% and reduced for 10 min. The film may be taken out and washed with deionize with deionized water to obtain a composite film based on reduced graphene oxide, cellulose nanocrystals, and cellulose nanofibers.

Embodiment 3

In step (1), 1.0 g of graphite, 1.0 g of potassium nitrate, and 5.0 g of potassium permanganate may be weighed and added to 50 mL of 98% sulfuric acid, which may be stirred and mixed evenly in an ice water bath. Subsequently, the reactants may be transferred to a warm water bath at 35° C. for 1.0 h.

In step (2), 50 mL of deionized water may be added to the suspension in the step (1), which may be stirred for 0.5 h in a water bath at 80° C. to obtain a uniform suspension.

In step (3), 3.0 g of microcrystalline cellulose powder may be added to the uniform suspension obtained in the step (2), which may be stirred for 0.5 h in a water bath at 80° C.

In step (4), 20 mL of 30% hydrogen peroxide may be added to the product of the step (3) to terminate the reaction. The obtained suspension may be washed centrifugally twice under a condition that a centrifugation rate is 10000 rpm for 10 min.

In step (5), the centrifuged product obtained in the step (4) may be dispersed into deionized water and homogenized under high pressure for 0.5 h under a pressure of 80 MPa to obtain a uniform suspension mixed with graphene oxide, cellulose nanocrystals, and cellulose nanofibers.

In step (6), the suspension obtained in the step (5) may be dropped into a petri dish and dried in an oven at 45° C. for 12 h to obtain a composite film based on graphene oxide, cellulose nanocrystals, and cellulose nanofibers.

In step (7), the composite film obtained in the step (6) may be soaked in a hydroiodic acid solution with a mass fraction concentration of 47% and reduced for 10 min. The film may be taken out and washed with deionized water to obtain a composite film based on reduced graphene oxide, cellulose nanocrystals, and cellulose nanofibers.

The present disclosure may hydrolyze cellulose using excess acid in the process of preparing graphene oxide to obtain cellulose nanocrystals and perform homogenization together to obtain the suspension mixed with graphene oxide, cellulose nanocrystals and cellulose nanofibers, which can not only reduce the use of hazardous chemicals, but also reduce energy consumption. In addition, the cellulose nanocrystals and the cellulose nanofibers may be used as spacer layers of reduced graphene oxide to increase an effective specific surface area of the reduced graphene oxide. The result shows that compared with the pure reduced graphene oxide film, the composite film based on reduced graphene oxide, cellulose nanocrystals, and cellulose nanofibers has a higher specific capacitance, and a better cycle stability and mechanical property. The composite film based on reduced graphene oxide, cellulose nanocrystals, and cellulose nanofibers can be further assembled into flexible supercapacitors or wearable electronic devices, thus having a wide range of applications in the field of flexible energy storage electronic devices.

What is claimed is:

1. A method for preparing a composite film based on reduced graphene oxide, cellulose nanocrystals, and cellulose nanofibers, comprising:
   in step (1), mixing graphite, potassium nitrate, potassium permanganate, and sulfuric acid in an ice water bath and stirring evenly to obtain a mixture, and transferring the mixture to a warm water bath perform a reaction; subsequently, adding deionized water to a reaction system including the mixture, increasing a temperature of the water bath, and stirring;
   finally, lowering the temperature of the water bath, adding hardwood microcrystalline cellulose, and stirring; adding hydrogen peroxide solution after stirring to terminate the reaction to obtain a suspension mixed with graphite oxide and cellulose;

in step (2), centrifuging the suspension obtained in the step (1) and washing a sediment after centrifuging with deionized water to obtain a solution, homogenizing the solution in a high-pressure homogenizer to obtain a suspension mixed with graphene oxide, cellulose nanocrystals, and cellulose nanofibers;

in step (3), drying the suspension mixed with graphene oxide, cellulose nanocrystals, and cellulose nanofibers in a petri dish to obtain a dried film, and soaking the dried film in a hydroiodic acid solution to obtain reduced graphene oxide, cellulose nanocrystals, and cellulose nanofibers to obtain a soaked film; and washing the soaked film with deionized water to obtain the composite film based on the reduced graphene oxide, the cellulose nanocrystals, and the cellulose nanofibers, wherein a mass ratio of the reduced graphene oxide, the cellulose nanocrystals, and the cellulose nanofibers in the composite film in the step (3) is 1:0.1-1:0.1-2.

2. The method of claim 1, wherein in the step (1), a temperature of the warm water bath is 35° C., a reaction time in the warm water bath is 0.5 h, the increased temperature of the water bath is 80° C., and the lowered temperature of the water bath is 50° C.

3. The method of claim 1, wherein in the step (2), a count of centrifugation and washing is 2 times, a centrifugation rate is 10,000 rpm, and a time of a single centrifugation is 10 min.

4. The method of claim 3, wherein in the step (2), a pressure in the high-pressure homogenizer is 60 MPa-80 MPa and a homogenization time is 0.5 h.

5. The method of claim 1, wherein in the step (3), a drying temperature is 45° C. and a drying time is 12 h; and a mass fraction concentration of the hydriodic acid solution is 47% and a soaking condition is soaking for 10 min at 25° C.

* * * * *